United States Patent [19]

Miller

[11] 3,966,003
[45] June 29, 1976

[54] WEIGHING APPARATUS
[75] Inventor: Henry F. Miller, Clifton, N.J.
[73] Assignee: Uniroyal Inc., New York, N.Y.
[22] Filed: Oct. 15, 1974
[21] Appl. No.: 514,518

[52] U.S. Cl. .............................................. 177/211
[51] Int. Cl.² ......................................... G01G 3/14
[58] Field of Search .................. 177/134, 135, 211; 73/141 A

[56] References Cited
UNITED STATES PATENTS
3,439,761  4/1969  Laimins ............................. 177/211

Primary Examiner—George H. Miller, Jr.
Attorney, Agent, or Firm—Charles A. Blank

[57] ABSTRACT

Weighing apparatus which utilizes the variation in the strain of a weighing platform adapted to be loaded by the force to be measured. The weighing apparatus has a low profile and, in the preferred embodiment, the platform is supported at its four corners by sensing arms in which the strain is measured by resistive or semi-conductive strain sensors which are connected in a Wheatstone type bridge circuit.

7 Claims, 10 Drawing Figures

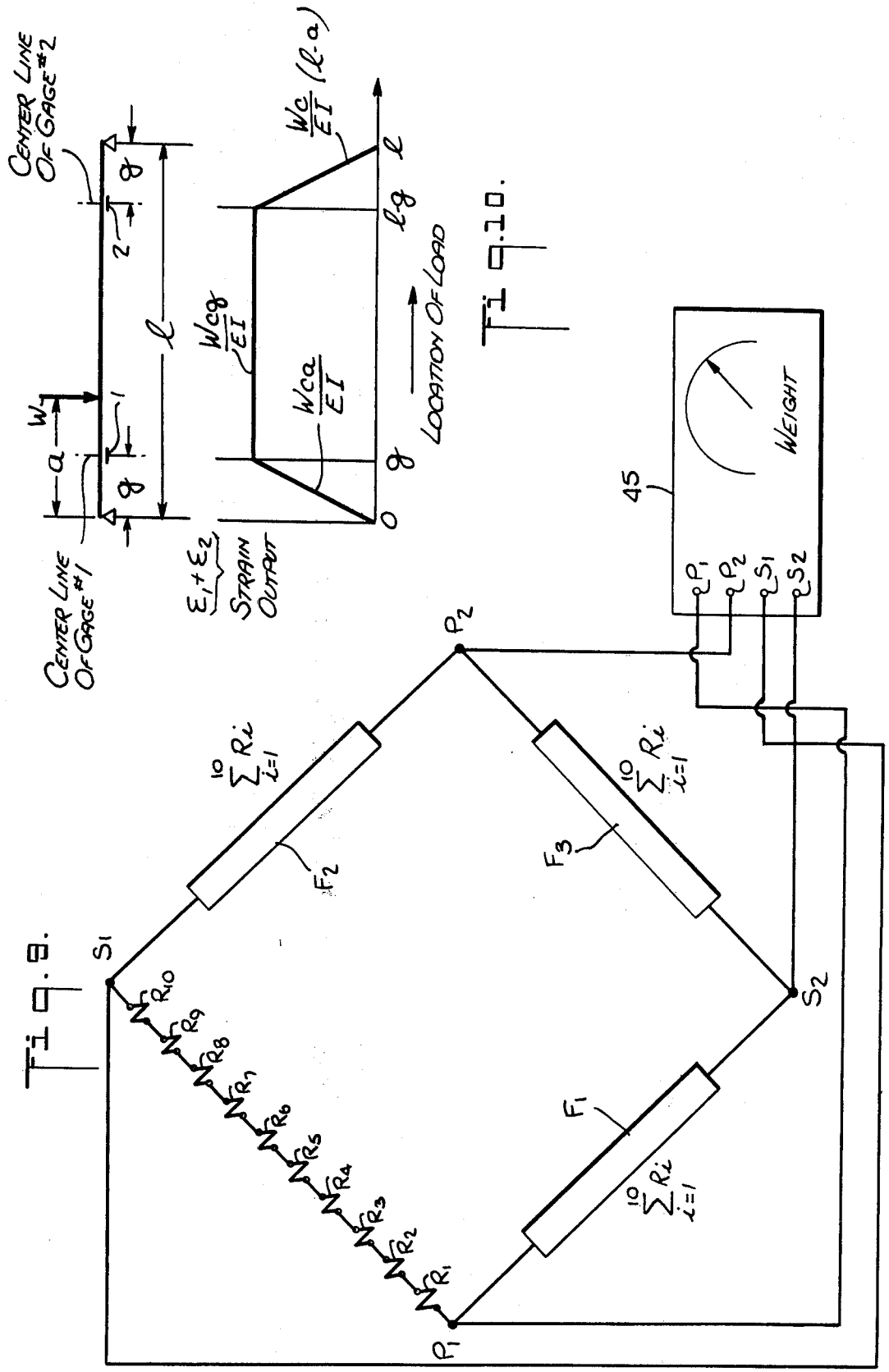

3,966,003

WEIGHING APPARATUS

The present invention relates to weighing apparatus and, more particularly, to such apparatus having a low profile and suitable for weighing a load such as the load which may be imposed by the wheel of a vehicle.

Prior weighing apparatus has been subject to the limitations that (1) costly excavation and subsurface structure is required and (2) shear type loadings are detrimental to the load sensing portion of the subsurface structure.

It is an object of the present invention therefore to provide a new and improved weighing apparatus which avoids one or more of the above mentioned disadvantages of prior such apparatus.

It is another object of the invention to provide a new and improved low profile weighing apparatus which is capable of weighing the load from a vehicle wheel thereon.

In accordance with the invention, weighing apparatus comprises a supporting base and an elongated horizontal platform adapted to be loaded by an object to be weighed and attached to the base at two ends of the platform. The platform has four horizontally placed flexible elongated parallel supporting arms attaching the platform to the base. Each of the supporting arms has attached thereto one or more electrical strain sensors. The sensors are so located on the arms and so connected in a single electrical bridge circuit as to provide an electrical signal representative of the load applied to the platform in a direction normal to the platform. The bridge circuit is non-responsive to shear loads applied to the platform in planes parallel to the plane of the platform and is non-responsive to the location of the load and the area of contact between the load and the platform.

Also in accordance with the invention, weighing apparatus comprises a supporting base and an elongated horizontal platform adapted to be loaded by an object to be weighed and attached to the base at two ends of the platform. The platform has slots therein extending longitudinally of the platform forming a plurality of independently flexible elongated beams in the platform. Each of the beams has an electrical strain sensor attached thereto near each end of the beam. The electrical sensors are so connected in a single electrical bridge circuit as to provide an electrical signal representative of the load applied to the platform in a direction normal to the platform. The bridge circuit is non-responsive to shear loads applied to the platform in planes parallel to the plane of the platform and is non-responsive to the location of the load and the area of contact between the load and the platform. Thus, the indicated load remains constant as the load traverses the platform in any direction.

For a better understanding of the present invention, together with other and further objects thereof, reference is made to the following description, taken in connection with the accompanying drawings and its scope will be pointed out in the appended claims.

DESCRIPTION OF THE DRAWINGS

Referring to the drawings:

FIG. 3 is an elevational view of the weighing apparatus shown in FIG. 1 with the side plate removed;

FIG. 9 is a schematic diagram of the electrical circuitry associated with the strain gage configuration represented in FIG. 8; and FIG. 10 is a schematic representation of one of the beams of FIG. 1 and the corresponding output signal of its associated strain gages as the transverse load moves from one end of the beam to the other.

DESCRIPTION OF THE PREFERRED EMBODIMENT

Figure 1:
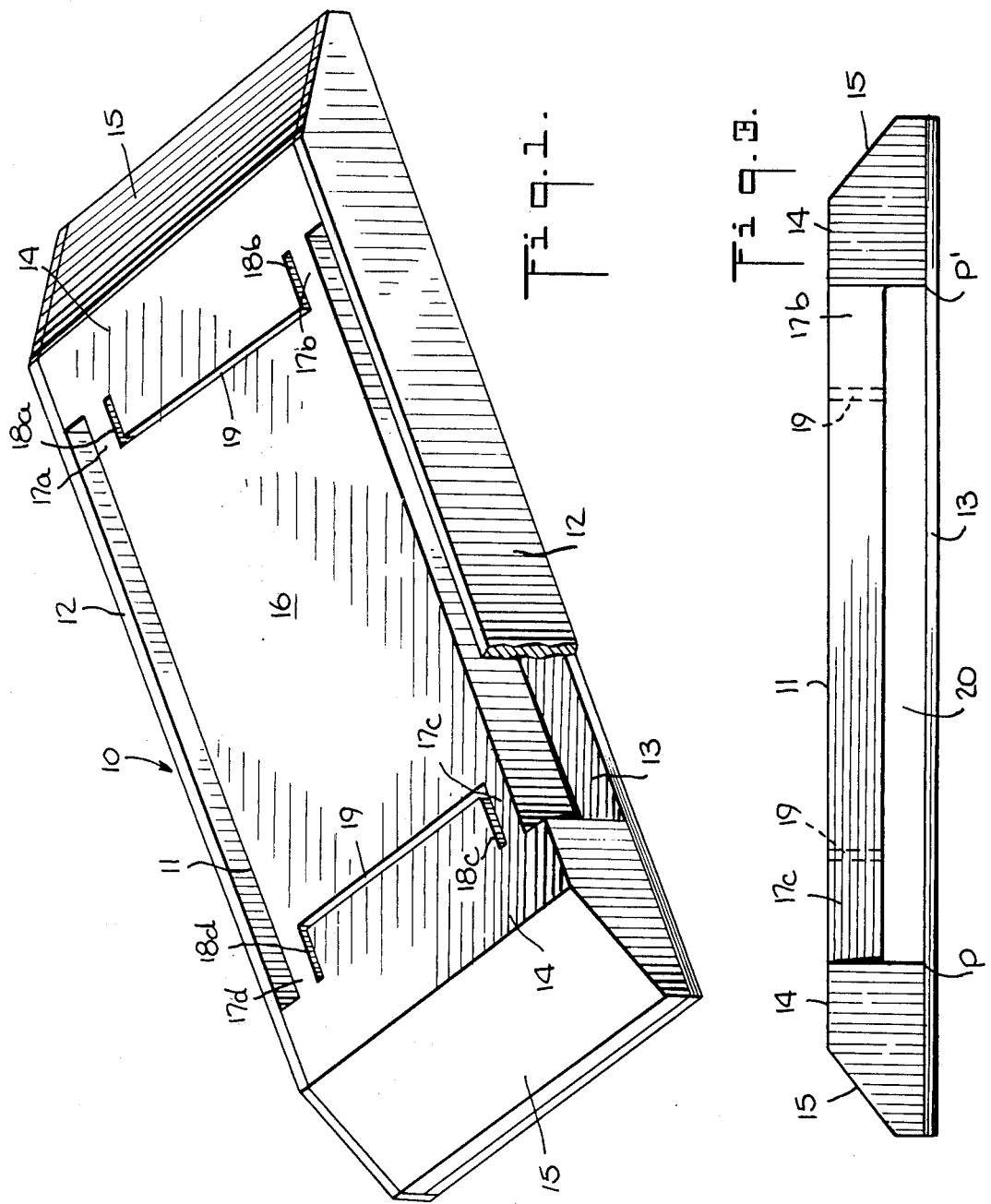
FIG. 1 is a perspective view of a preferred embodiment of weighing apparatus constructed in accordance with the invention with a portion of a side plate broken away.
Figure 2:
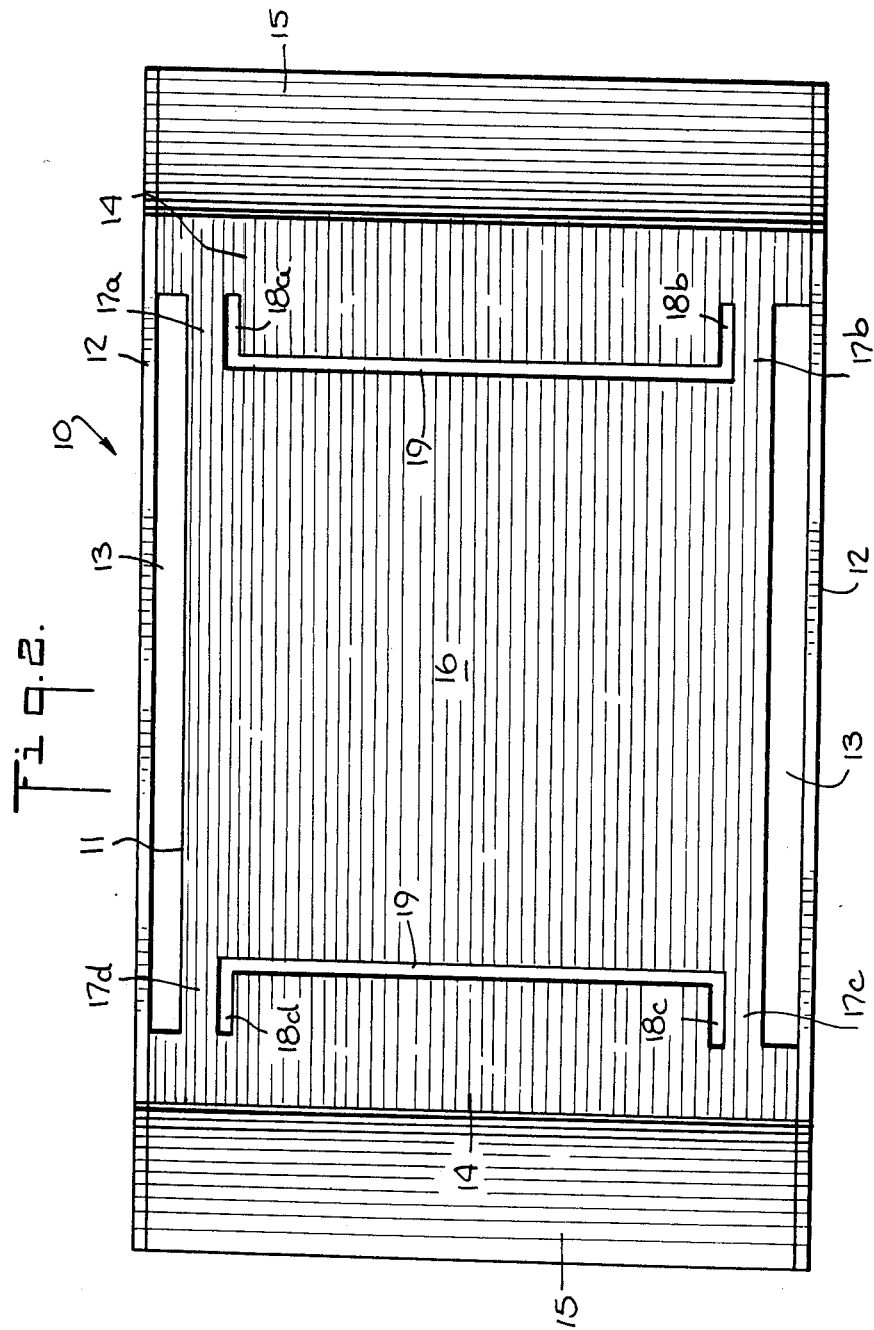
FIG. 2 is a top plan view of the weighing apparatus shown in FIG. 1.

Referring now more particularly to FIGS. 1, 2 and 3 of the drawings, there is represented therein a preferred embodiment of weighing apparatus 10 constructed in accordance with the invention. The weighing apparatus 10 includes a supporting base 13 and an elongated horizontal platform, preferably of metal, adapted to be loaded by an object to be weighed and attached to the base at two ends of the platform. The platform 16 includes a body section 11 and the four horizontally displaced, flexible, parallel supporting arms 17a, 17b, 17c, 17d attaching the platform to the rigid support sections 14, the ramp sections 15 and the side plates 12 and base 13. The load measuring sections of the platform 16 are formed by longitudinal slots 18a, 18b, 18c, 18d and intersecting transverse slots 19 in the platform 16. The lengths of the load-sensing arms 17a, 17b, 17c, 17d are equal to each other and are also equal to the length of slots 18a, 18b, 18c, 18d, causing the load-sensing arms to have the same load-deflection characteristics. To obtain different load-deflection characteristics, these sensing arms can be made of different lengths and in some cases arms of unequal lenght, width or thickness may be used.

Each of the supporting arms 17a, 17b, 17c, 17d has attached thereto two electrical strain sensors. The sensors are so located on the arms and so connected in a single electrical bridge circuit as to provide an electrical signal representative of the force applied the platform in a direction normal to the platform. The bridge circuit is non-responsive to shear force applied to the platform in the longitudinal direction of the arms.

Figure 4:
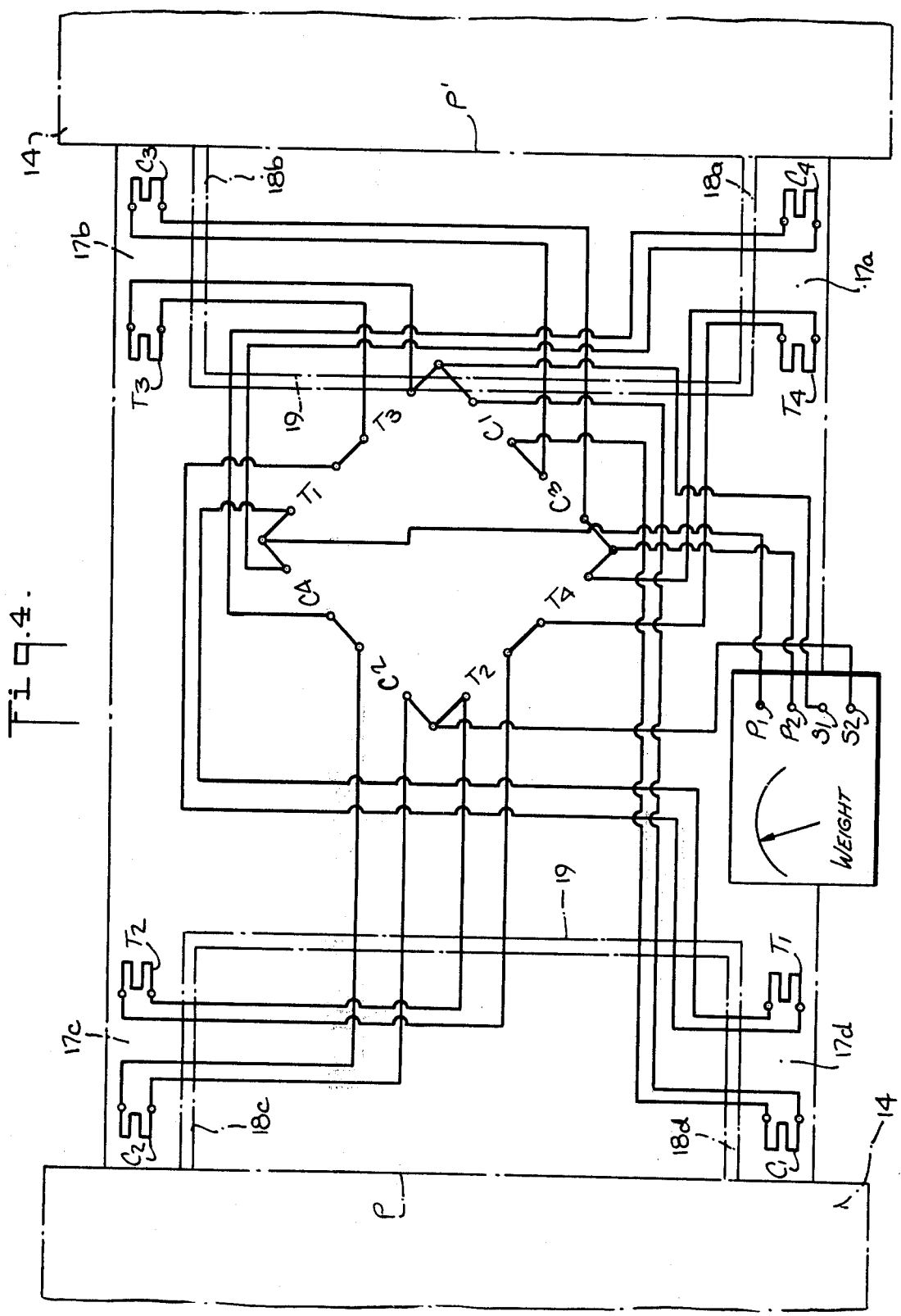
FIG. 4 is a bottom plan view of the weighing apparatus shown in FIG. 1 with the bottom plate removed to represent schematically the location of the strain gages and associated circuitry.

Referring now to FIG. 4, which is a portion of a bottom plan view of the weighing platform shown in FIG. 1 with the bottom plate 13 and side plates 12 removed, the strain sensing elements C1, C2, C3, C4, T1, T2, T3, and T4 are bonded to the bottom surface of the sensing arms 17a, 17b, 17c, and 17d. These strain sensing elements preferably are resistive or semi-conductive type strain gages. An example of the resistive type sensing element is catalog No. EA-13-125-AC-120 sold by Micro-Measurements, Inc. of Romulus, Michigan. An example of the semi-conductive type sensing element is catalog No. MS-942-350-6 sold by Micro Systems Incorporated of San Gabriel, Cal. These two types of strain gages, when bonded to a surface with a suitable cement such as M-Bond 610 Adhesive sold by Micro Measurements, Inc. will undergo an electrical resistance change when the surface is subjected to mechanical strain. This resistance change in turn can be observed as a voltage change which can be measured, for example, using Wheatstone bridge type instrumentation such as the Budd Company's Model P-350 Portable Strain Indicator. It is, of course, possible to relate this voltage change to the magnitude of the mechanical load which is causing the mechanical strain of the surface to which the gage has been bonded.

The construction of the weighing platform permits the measurement of a randomly located loading force which is directed normal to the plane of the loading section 16 and the platform is insensitive to loading forces parallel to the plane of this surface. This is accomplished by locating the strain gages as indicated in FIG. 4, that is, on the bottom surface of the load sensing arms 17a, 17b, 17c, 17d in the configuration shown in FIG. 4. In this location the strain gages and associated wiring are also protected from accidental damage. The load indication displayed by the instrumentation is completely insensitive to the location of the loading force on the loading section 16 and the area of contact or footprint of said loading force.

When the loading section 16 is mechanically loaded, this causes a deflection in each one of the four load sensing arms which act as beams with fixed ends. The half sections of the sensing arms abutting the rigid support sections 14 undergo a compressive strain on the surface to which the gages are bonded while the half sections abutting the load section 16 undergo a tensile strain. The respective surface strains vary in a linear fashion with respect to the magnitude of the applied mechanical load and also with respect to the distance from the center of the beam to the fixed ends. Thus strain gages C1, C2, C3 and C4 are subjected to compressive strains while strain gages T1, T2, T3 and T4 are subjected to tensile strains.

Thus, one sensor under each arm 17a, 17b, 17c, 17d, namely, each of the sensors C4, C3, C2, and C1, is subject to compression and the other sensor under each arm 17a, 17b, 17c, 17d, namely, each of the sensors T4, T3, T2, T1, is subject to tension when the platform is loaded by a force acting perpendicular to the platform 16. The sensors subject to compression, C1, C3 and C2, C4 are connected in two opposite arms of a Wheatstone bridge circuit and the sensors subject to tension T1, T3 and T2, T4 are connected in two opposite arms of the Wheatstone bridge circuit as indicated diagrammatically in FIG. 4.

When the gages are connected in a Wheatstone bridge circuit as represented in FIG. 4, the output signal represents the sum of the tensile and compressive strains resulting from the mechanical loading of the loading section 16. Thus, there is a direct relationship between the applied mechanical load and the resulting total strain which can be converted into a direct readout by suitable instrumentation as indicated above.

Connecting the strain gages as shown in FIG. 4 cancels the effect of the applied load in planes parallel to the surface of the loading section. In FIG. 4 terminals P1 and P2 of the power supply and weight-indicating unit supply, for example, a direct-current voltage to the Wheatstone bridge and terminals S1 and S2 receive the output signal from the Wheatstone bridge.

The weighing platform is insensitive to the point of application of the load as well as the area of contact of the applied load on the loading section 16. It is to be noted that the circuitry is such that bending effects are additive and shear effects are cancelled. For example, when a shear load is applied to the left, gage C2 goes into compression and gage C4 goes into tension. However, since the gages are in the same arm of the bridge, these two effects cancel. When a bending load is applied, gages C2 and C4 undergo a compressive strain and because the gages are in the same arm of the bridge, the two compressive strains are additive. By placing like gages in opposite arms of the bridge, it is possible to sum up all the strains and associated voltages developed by each gage.

DETERMINATION OF LOAD SENSITIVITY

The governing parameters in the design of a weighing platform for the weighing apparatus of this invention are the load sensitivity, which is defined as the smallest increment of a load that can be measured, and the total load to be applied and measured.

The procedure for calculating these two parameters for a general type point loading is as follows: First, the reaction forces are calculated at each of the locations where the sensing arms (17a, 17b, 17c and 17d) join the rigid support sections 14. Using these reaction forces, bending moments at the center of each strain gage are calculated. These bending moments in turn are used to calculate the strain at each of the said locations. The absolute magnitudes of the strains are then summed to yield the total strain measured by the bridge circuit. This value of the strain is converted into the load in weight units. Using the total bridge strain and the applied load, a load sensitivity for the weighing platform can be calculated. This sensitivity can be expressed in terms of pounds/microstrain which is a measure of the smallest increment of a load that can be measured.

Using the above procedure a prototype of the preferred embodiment of the invention shown in FIGS. 1, 2, 3 and 4 was constructed. FIGS. 5a and 5b show the physical dimensions of the weighing platform with the side plates removed. The weighing platform, ramp sections, side panels and base plate were constructed from 7075-T6 aluminum. The weighing platform was designed to weigh loads up to a maximum of 1500 pounds which would make it suitable to measure the individual wheel loadings of a large passenger automobile.

Figure 5:
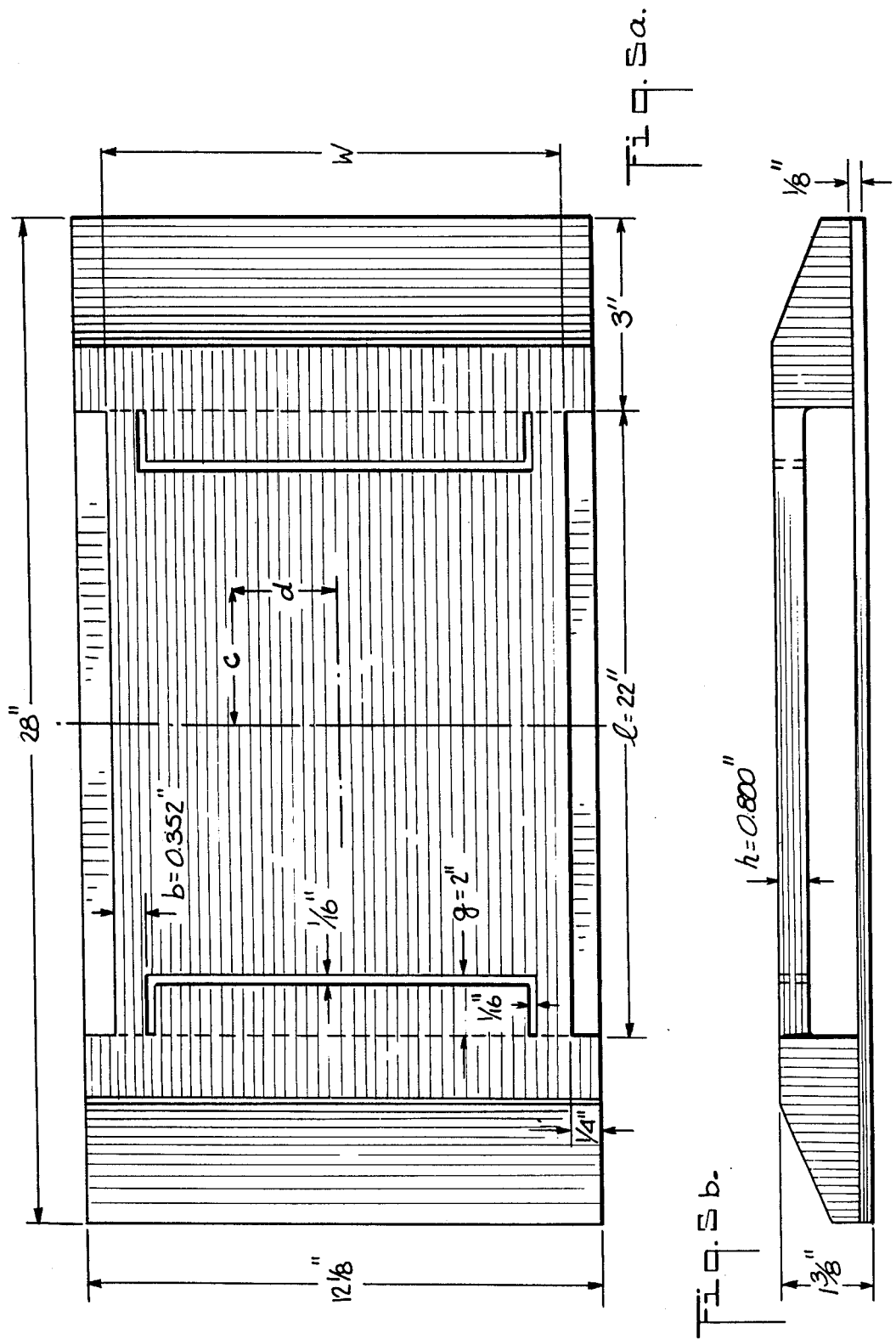
FIG. 5a is a top plan view of the FIG. 1 weighing apparatus with side plates removed so that preferred dimensions may be represented.
FIG. 5b is an elevational view of the weighing apparatus shown in FIG. 5a with the side plate removed so that preferred dimensions may be represented thereon.

The reaction forces for a general type loading were calculated from the following equations:

$$R_{17a} = \frac{P}{4}\left(1 + \frac{2c}{l} + \frac{2d}{w-b}\right)$$

$$R_{17b} = \frac{P}{4}\left(1 + \frac{2c}{l} - \frac{2d}{w-b}\right)$$

$$R_{17c} = \frac{P}{4}\left(1 - \frac{2c}{l} - \frac{2d}{w-b}\right)$$

$$R_{17d} = \frac{P}{4}\left(1 - \frac{2c}{l} + \frac{2d}{w-b}\right)$$

where the subscripts indicate the sensing arm for which the reaction applies. $P$ is the applied loading (1500 lbs) to be measured, and $c$, $l$, $d$, $w$, and $b$ are physical dimensions as indicated in FIG. 5, the intersection of lines $c$ and $d$ representing any general point of load application.

The bending moment B at each gage location was calculated from the following equations:

$$B_{17a} = \frac{P_a}{32}\left(1 + \frac{2c}{l} + \frac{2d}{w-b}\right)$$

$$B_{17b} = \frac{P_a}{32}\left(1 + \frac{2c}{l} - \frac{2d}{w-b}\right)$$

$$B_{17c} = \frac{P_a}{32}\left(1 - \frac{2c}{l} - \frac{2d}{w-b}\right)$$

$$B_{17d} = \frac{P_a}{32}\left(1 - \frac{2c}{l} + \frac{2d}{w-b}\right)$$

and where $g$ is the length of each sensing arm.

The strain of each gage location was calculated from the following relationships:

$$\sigma = Bk/I = E\epsilon$$

where $\sigma$ is the bending stress in the outer fibers of the sensing arms, $B$ is as defined above, $k$ is the distance from the neutral axis of the beam to the outside fiber, $I$ is the moment of inertia of the beam cross section about the neutral axis, $E$ is the modulus of elasticity of the aluminum material from which the weighing platform was fabricated and $\epsilon$ is the strain observed at each strain gage location.

The total bridge strain, $\epsilon_t$ was calculated using the following equation:

$$\epsilon_t = 3Pg/2Ebh^2$$

where $b$ is the width of the sensing arm, $h$ is the depth of the sensing arm as shown in FIG. 5.

The load sensitivity of the weighing platform S was calculated using the following equation:

$$S = 2Ebh^2/3g$$

For 7075 aluminum and the geometry indicated in FIG. 5; $E = 10 \times 10^6$ psi, $b = 0.352$ inch, $h = 0.80$ inch and $g = 2.0$ inch.
Whence, $S = 0.75$ pounds/microstrain;

which means that an instrument reading in microstrain units and displaying a value of 2000 is measuring and indicating an applied load of 1500 pounds.

The measured sensitivity of the weighing platform was 0.73 pounds/microstrain which is in excellent agreement with the theoretical or calculated sensitivity.

In order to prevent rotation of the weighing platform around points P and P' (FIG. 3) during the application of the load, base plate 13 and side plates 12 have been added. The side and base plates form a U-shaped channel which serves to increase the overall stiffness of the rigid support sections 14.

In designing the sensing elements, the maximum allowable strain should be no greater than that corresponding to the strain at one-half of the yield point for the particular material being used. This criterion should be observed for all loading conditions.

Referring now to FIGS. 6–10, inclusive, there is represented another embodiment of weighing apparatus constructed in accordance with the invention. The weighing apparatus 30 includes a supporting base having side plates 32 and base plate 33. The apparatus also includes an elongated horizontal platform 31 adapted to be loaded by an object to be weighed and attached to the base at two ends of the platform. The platform has slots 41 therein extending longitudinally of the platform forming a plurality of independently flexible elongated beams 36–40 in the platform. The beams 36–40 preferably are of the same dimensions. Two rigid ramp sections 35 support the ends of the platform 31. The beams 36 and 40 are separated from the side plates 32 by slots 42.

Figure 8:
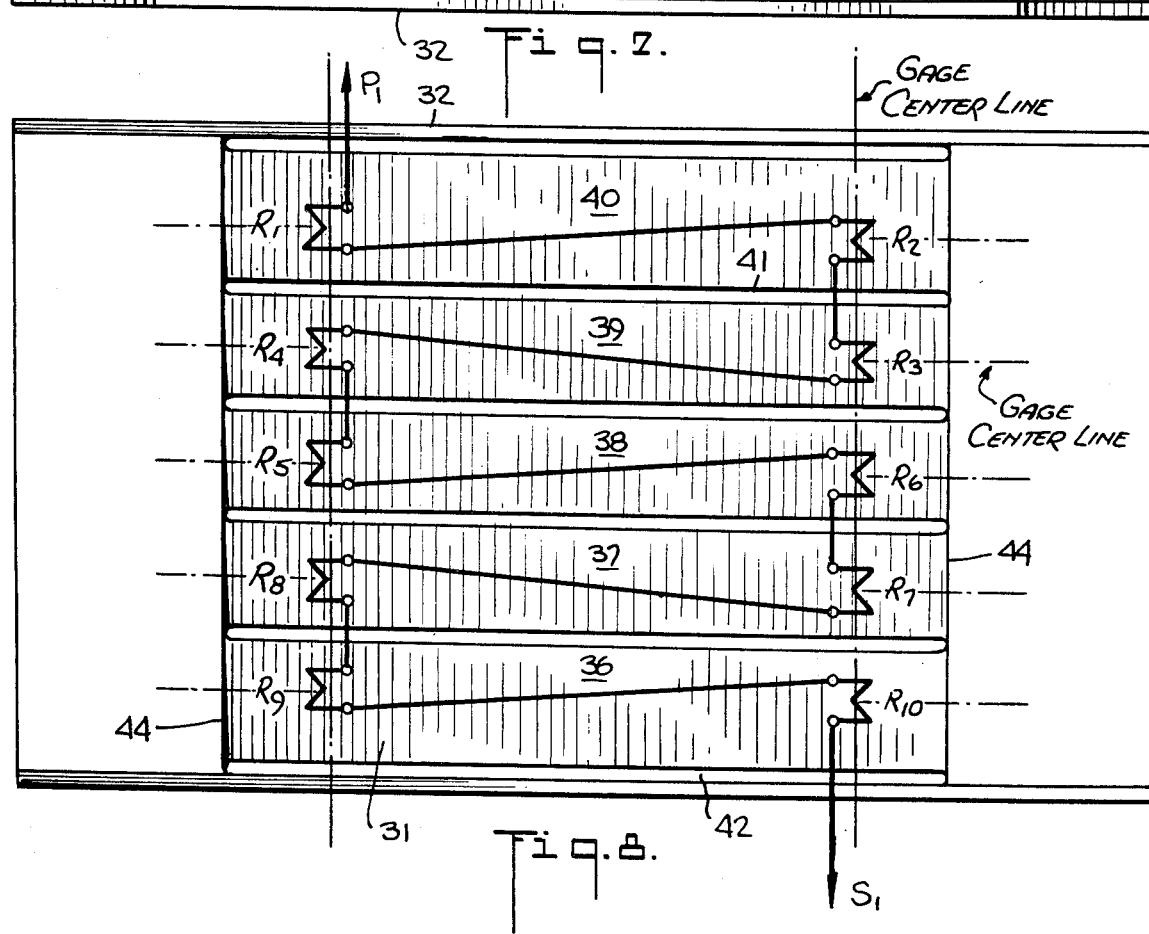
FIG. 8 is a bottom plan view of the FIG. 6 apparatus with the bottom plate removed and representing schematically the location of strain gages in a quarter-bridge configuration.

Each of the beams 36–40 has an electrical strain sensor attached thereto near each end of the beam. The electrical sensors are, for example, strain gages $R_1 - R_{10}$ of the same electrical resistance and located as represented schematically in FIG. 8. The electrical sensors are so connected in a single bridge circuit as to provide an electrical signal representative of the force applied to the platform in a direction normal to the platform. As represented in FIG. 8, the strain gages $R_1 - R_{10}$ preferably are on the center lines of the beams 36–40 amd at a distance from the edges 44 such that the beams are insensitive to the location of the load when it is applied to each beam between the two strain gages.

The bridge circuit is non-responsive to shear force applied to the platform in the longitudinal direction of the platform.

The strain gages are so disposed that they are sensitive only to transverse loadings and are therefore unaffected by shear loads or loads that might twist the beams about the center line between the gages.

The associated electrical circuitry, as shown in FIG. 9 is such that all the active gages, $R_1$ through $R_{10}$ are in one arm of a Wheatstone bridge. The remaining three arms are made up of three fixed resistors $F_1$, $F_2$ and $F_3$ whose resistance values are equal to the summation of the resistance values of gages $R_1$ through $R_{10}$. This presents a balanced Wheatstone bridge to indicator 45 and thus the application of a transverse load to be measured unbalances the active arm of the bridge consisting of resistors $R_1$ through $R_{10}$. The magnitude of the unbalance provides a measure of the applied transverse loading.

While only a quarter-bridge configuration is shown, it is obvious that half- and full-bridge configurations could be used by providing the necessary additional gages.

Figure 6:
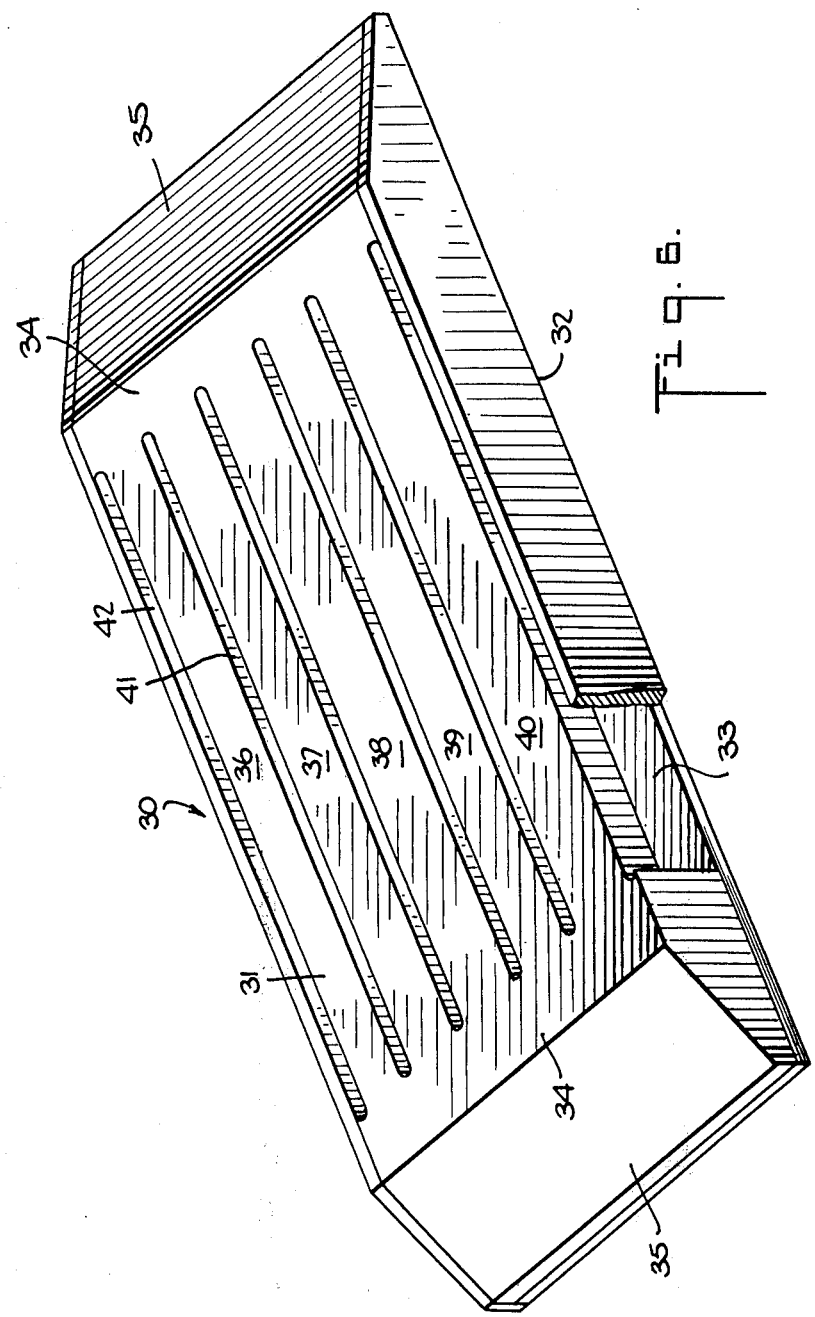
FIG. 6 is a perspective view of another embodiment of the invention with a portion broken away.
Figure 7:
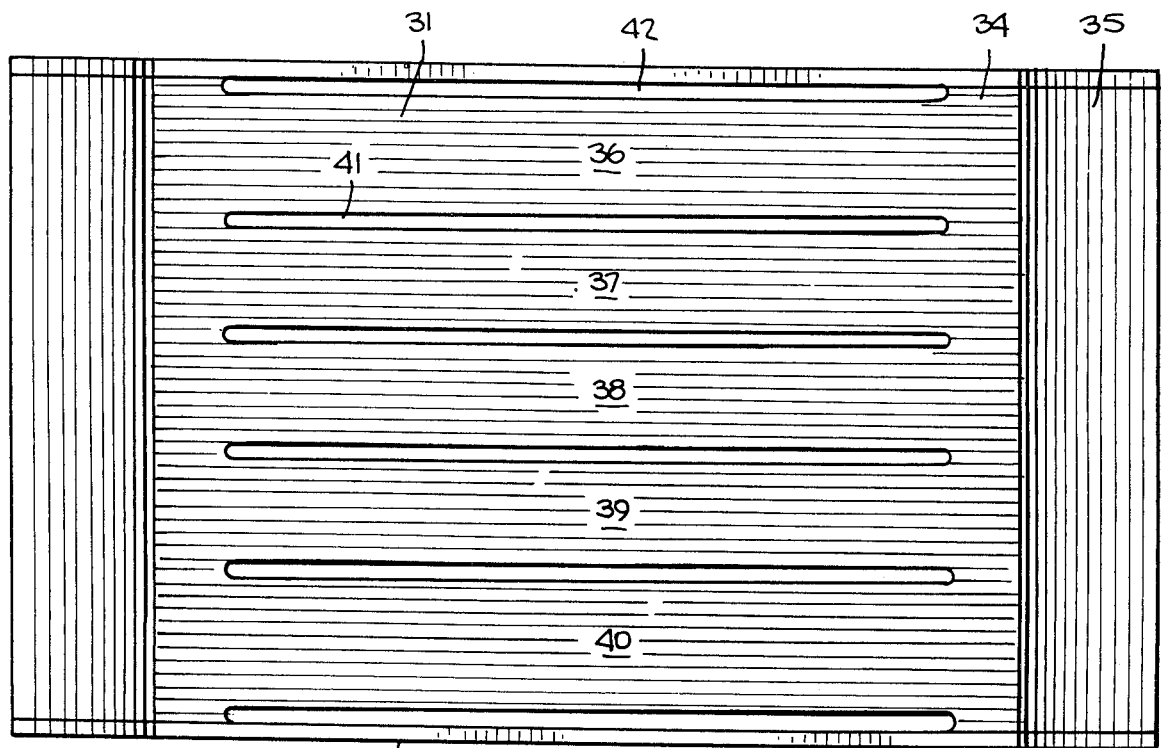
FIG. 7 is a top plan view of the FIG. 6 weighing apparatus.

Referring to FIG. 6 the fundamental difference between the weighing device described in the preferred FIG. 1 embodiment and the slotted plate device described herein is in the loading platform itself. In the preferred FIG. 1 embodiment, the weighing platform is "H-shaped" and the strain gages are used at each support to sum the total reactive force on the platform. In the slotted platform of the FIG. 6 embodiment, the platform is formed by a plurality of beams. The applied loading area covers one or more of the slotted beams and causes it or them to deflect. Considering FIG. 10*l* represents the length of the slotted beam, W represents the load to be measured and *a* is the location of the load on the beam, and *g* represents the locations of the strain gages. The lower portion of FIG. 10 represents the output of strain gages 1 and 2 with respect to the position of the load along the beam length *l*. With W at $a = o$, the strain gage output $\epsilon_1 + \epsilon_2$ is zero. As the weight approaches the location of strain gage 1, the output of the strain gages $\epsilon_1 + \epsilon_2$ increases linearly to a magnitude equal to Wcg/EI where c is the distance from the neutral axis to the extreme fiber to which the strain gages are applied, E is the Young's modulus of the material from which the beam is fabricated and I is the moment of inertia about the neutral axis. For all locations of the load between $g \leq a \leq l-g$ the output $\epsilon_1 + \epsilon_2$ is constant, at Wcg/EI, i.e., the beam is insensitive to the position of the load. For locations between $l-g \leq a \leq l$ the magnitude of the output $\epsilon_1 + \epsilon_2$ decreases linearly from Wcg/EI to zero in a symmetrical fashion to the rise in $\epsilon_1 + \epsilon_2$ from $0 \leq a \leq g$. Thus with the gages located as shown in FIG. 10 the beam is insensitive to the location of the load between points $g \leq a \leq l-g$, i.e., between the strain gages. If it is undesirable to have the output show the rise and fall of load between $0 \leq a \leq g$ and $l-g \leq a \leq l$ the platform of the weighing device can be covered by a flat rigid plate in these areas to prevent contact between the load and the weighing beams except for the area between the gages.

Note that the beams are relatively long and thin. This is to provide for insensitivity to location of the load transverse to the dimension *l* in FIG. 10. If the footprint of the load is large enough to cover only one beam the output will be $\epsilon_1 + \epsilon_2$ as shown in FIG. 10. If for example the footprint of the load covers two beams, each beam will carry a load equal to W/2 with the corresponding output per beam equal to $(\epsilon_1 + \epsilon_2)2$. The Wheatstone bridge sums these two outputs and yields $\epsilon_1 + \epsilon_2$ corresponding to the load W. This demonstrates the manner in which insensitivity to load location transverse to the dimension *l* is achieved. If the footprint covers 3 beams, then each strain indicated by each beam is $(\epsilon_1 + \epsilon_2)3$ and again the Wheatstone bridge sums these three outputs.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

I claim:

1. Weighing apparatus comprising:
   a supporting base;
   an elongated horizontal platform adapted to be loaded by an object to be weighed and attached to said base at two ends of said platform, said platform having four horizontally displaced flexible elongated parallel supporting arms in the plane of said platform and integral therewith and attaching said platform to said base, each of said supporting arms having attached thereto one or more electrical strain sensors, said sensors being so located on said arms and so connected in a single electrical bridge circuit as to provide an electrical signal representative of the load applied to said platform in a direction normal to said platform, said bridge circuit being non-responsive to shear loads applied to said platform in planes parallel to the plane of said platform and being non-responsive to the location of the load and the area of contact between the load and the platform.

2. Weighing apparatus in accordance with claim 1 in which all of said electrical sensors are attached under said supporting arms with one sensor under each arm being subject to compression and another sensor under each arm being subject to tension when said platform is loaded by a force acting perpendicularly to said platform.

3. Weighing apparatus in accordance with claim 2 in which said platform has a rectangular surface and in which said sensors subject to compression are connected in two opposite arms of a Wheatstone bridge circuit and said sensors subject to tension are connected in two opposite arms of said Wheatstone bridge circuit and in which said sensors subject to compression under a first pair of diagonally opposite arms of said platform are connected in the same first arm of said Wheatstone bridge circuit and in which said sensors subject to compression under a second pair of diagonally opposite arms of said platform are connected in the same second arm of said Wheatstone bridge circuit and in which said sensors subject to tension under said first pair of diagonally opposite arms of said platform are connected in the same third arm of said Wheatstone bridge circuit and in which said sensors subject to tension under said second pair of diagonally opposite arms of said platform are connected in the same fourth arm of said Wheatstone bridge circuit.

4. Weighing apparatus comprising:
   a supporting base;
   an elongated horizontal platform adapted to be loaded by an object to be weighed and attached to said base at two ends of said platform, said platform having four horizontally displaced flexible elongated parallel supporting arms attaching said platform to said base, said platform having slots therein extending longitudinally and transversely of said platform forming said supporting arms, each of said supporting arms having attached thereto one or more electrical strain sensors, said sensors being so located on said arms and so connected in a single electrial bridge circuit as to provide an electrical signal representative of the load applied to said platform in a direction normal to said platform, said bridge circuit being non-responsive to shear loads applied to said platform in planes parallel to the plane of said platform and being non-responsive to the location of the load and the area of contact between the load and the platform.

5. Weighing apparatus comprising:
   a supporting base;
   an elongated horizontal platform adapted to be loaded by an object to be weighed and attached to said base at two ends of said platform, said platform having slots therein extending longitudinally of said platform forming a plurality of independently flexible elongated beams in said platform, each of said beams having an electrical strain sensor attached thereto near each end of said beam, said electrical sensors being so connected in a single electrical bridge circuit as to provide an electrical signal representative of the load applied to said platform in a direction normal to said platform, said bridge circuit being non-responsive to shear loads applied to said platform in planes parallel to the plane of said platform and being non-responsive to the location of the load and the area of contact between the load and the platform.

6. Weighing apparatus in accordance with claim 5 in which said beams are of the same dimensions.

7. Weighing apparatus in accordance with claim 6 in which said electrical sensors have the same electrical resistance and are connected in series in an arm of a Wheatstone bridge circuit.

* * * * *